Feb. 3, 1942.  C. C. HALKYARD  2,272,115

RUBBER RING PIPE JOINT

Filed Oct. 1, 1940

Inventor:
Charles Cyril Halkyard
By Young, Emery & Thompson
Attorneys

Patented Feb. 3, 1942

2,272,115

UNITED STATES PATENT OFFICE 2,272,115

RUBBER RING PIPE JOINT

Charles Cyril Halkyard, Melbourne, Victoria, Australia, assignor to Hume Pipe Company (Australia) Limited, Melbourne, Victoria, Australia Application October 1, 1940, Serial No. 359,277

1 Claim. (Cl. 285—163)

This invention relates to jointing means for concrete pipes of the faucet and spigot type wherein a compressible sealing ring, usually composed of rubber, is positioned around a spigot end and, by the insertion of the spigot end into a faucet end, is rolled in a compressed condition into the annular space between the faucet and the spigot ends and is brought to rest against an abutment at the inner end of the spigot.

The present invention aims to provide improvements in joints of the kind indicated whereby their efficiency will be increased, as will be fully described and explained hereafter and defined in the appended claim.

In the accompanying drawing which illustrates a preferred form of the invention:

Figure 1:
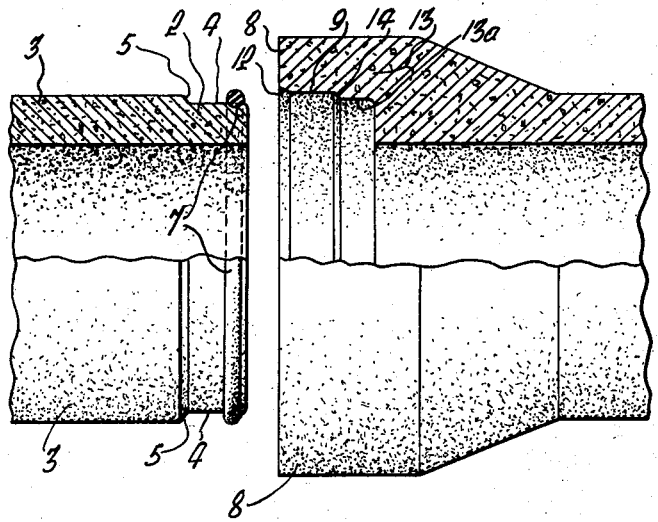
Figure 1 is a part sectional view of spigot and faucet ends of two pipes to be joined and a rubber sealing ring in its initial or starting position around the spigot end.

The spigot portion 2 is as usual reduced somewhat in external diameter in relation to the main body 3 of the pipe and the outer surface 4 of the spigot portion is, according to the invention, parallel with the axis of the pipe or, in other words, purely cylindrical. The advantages arising from such a cylindrical surface will be pointed out hereinafter. A shoulder or abutment face 5 is as usual formed between the main body 3 and the spigot portion 2.

At a short distance from its outer extremity the spigot portion is provided around its exterior with a circumferential recess 6 which forms an initial seating for the sealing ring 7, and ensures that the ring while being rolled along the spigot 2 into its final sealing position, as hereinafter described, will remain in a plane that is normal to the axis of the pipe.

The faucet portion 8 of the pipe according to the invention has an internal surface 9 which, in association with surface 4 of the spigot 2 forms an annular space 11 for accommodating the ring 7 when in its final sealing position. Surface 9, like surface 4, should be purely cylindrical.

The mouth or outer extremity of the faucet should be flared or bevelled as at 12 to facilitate the initial entry of the spigot and sealing ring and the commencement of the rolling of the ring 7 along the spigot surface 4. The faucet 8 has an inner end portion 13 of reduced internal diameter, and the face 13a thereof is connected to face 9 by a shoulder or abutment face 14 as usual.

Figure 2:
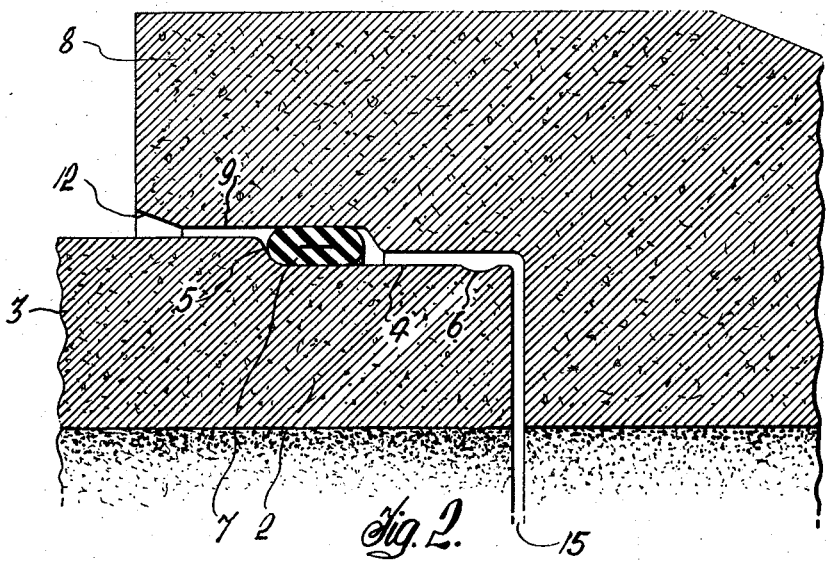
Figure 2 is an enlarged sectional view showing the pipe ends when joined in accordance with the invention.

In order to join the pipes, the rubber ring 7 (which is of slightly smaller internal diameter than the diameter of the bottom of the circumferential recess 6) is placed in the said circumferential recess 6 in the spigot portion 2, which is then entered lengthwise into flared end of the faucet. The ring is thereby increasingly compressed between the bevelled face 12 and the spigot portion and, during continued longitudinal movement of the spigot in relation to the faucet, is rolled out of recess 6 and along the companion cylindrical surfaces 4 and 9 until it reaches a position as seen in Figure 2 in which the ring comes to rest against abutment face 5 of the spigot.

Hitherto, the companion faces of the faucet and spigot portions that define the annular space for the sealing ring have been inclined relative to the axis of the pipe or, in other words, have been portions of cones. Thus the sealing ring while being rolled along the spigot portion, has its mean diameter gradually increased and by reason of its resiliency the ring has a natural tendency to return down the inclined face of the spigot to the smaller or outer end. After the pipe ends have been pushed home as aforesaid there is almost invariably a tendency for them to spring back slightly and such tendency is increased if the surfaces of the spigot and faucet are inclined as aforesaid with the result that the ring may become misplaced and cause the joint to leak.

Such objections are overcome in accordance with the present invention wherein the formation of the surfaces 4 and 9 as cylindrical, instead of conical, ensures that the mean diameter of the ring will remain constant irrespective of the position it occupies along the spigot and thus the cylindrical surfaces 4 and 9 will not be the cause of any tendency for the sealing ring to ride towards either end thereof.

Figure 3:
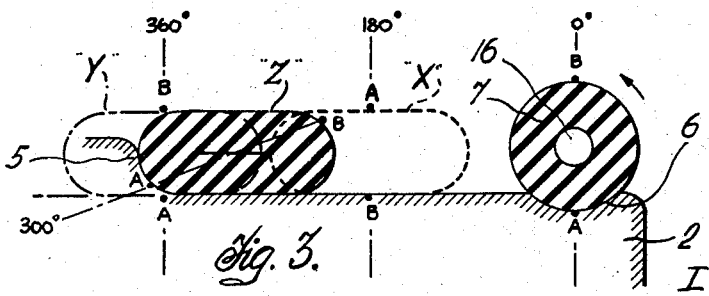
Figure 3 is a diagrammatic view showing the rubber sealing ring at different positions along the spigot end in order to assist understanding of certain aspects of the invention.

A further feature of the invention will now be explained with reference to Figure 3 which illustrates various positions that the ring 7 may occupy by being rolled along the spigot. It will be evident that as the ring is moved from its initial position in the recess 6 the inner peripheral portion, denoted by the reference A, will gradually shift around towards the outside while the outer peripheral portion, denoted by the reference B, will gradually shift towards the inside, until the ring has been rolled through an arc of 180° as shown in the dotted line position X wherein the points A and B are reversed.

Such deformation of the cross section of the ring is yieldingly resisted and unless and until the ring has been rolled up to or beyond the 180°, or half revolution, position C, it will always have a nautural tendency to roll back towards the recess 6 and to force the spigot outwardly from the surrounding faucet. If, however, rolling of the ring is continued beyond the said 180° or half revolution position X towards, but not into, the 360° or complete revolution position Y shown in chain dot lines, then the reaction of the ring is reversed and the potential force or pressure of the ring set up by its tendency to regain its normal cross section will oppose withdrawal of the spigot from the faucet. The ring should therefore come to rest against shoulder 5 after it has been rolled along the spigot for more than a half of a revolution but less than one complete revolution as shown in the unbroken line position Z.

This aspect of the invention may, therefore, be expressed as making provision for opposing inadvertent withdrawal of the spigot from the faucet by coordinating the cross sectional diameter of the ring 7 with the distance between the circumferential recess 6 at the outer end of the spigot and the abutment face 5 at the inner end thereof, in such manner that in operatively inserting the spigot within the faucet said rubber ring 7 comes to rest against said abutment face 5 after the ring has been rolled along the spigot for more than one half of a revolution but for less than one complete revolution.

The purpose of the shoulder 14 between surfaces 9 and 13a of the faucet is to prevent the rubber ring from being forced inwardly from the annular space 11 towards the gap 15 between the pipe ends in the event that the interior of the pipe line is subjected to suction, or in the event that the pressure exterior to the pipe line is materially greater than the pressure obtaining within the pipe line.

One other feature of the invention remains to be described and this feature resides in employing a rubber sealing ring of hollow cross section, instead of solid cross section, as has hitherto been the practice in the art. Thus according to the invention the rubber ring has a central passageway 16 which facilitates compressing or flattening of the ring to a desirable extent when it is being rolled into operative position and thereby provides for an increased area of contact between the periphery of the ring and the surfaces 3 and 9 of the spigot and faucet.

Having now described my invention what I claim as new and desire to secure by Letters Patent is:

An improved joint for spigot and faucet ended pipes, comprising a pipe having a spigot portion of reduced external diameter, a shoulder or abutment face being formed at the junction of said spigot portion with the main body of the pipe, said spigot portion being provided externally near its outer extremity with a circumferential recess that extends in a plane that is normal to the axis of the pipe, a rubber or like sealing ring of circular cross section capable of being sprung into said recess, and a pipe having a faucet portion for fitting around said spigot portion so as to provide in association with said faucet an annular space within which said rubber ring in a compressed condition is rolled along the spigot towards said abutment face, the cross sectional diameter of said ring and the distance between said circumferential recess in the spigot portion and said abutment face being so coordinated that in operatively assembling the spigot within the faucet, said rubber ring comes to rest against said abutment face after the ring has been rolled along the spigot for more than one half of a revolution but for less than one complete revolution whereby any tendency of the ring to assume its original form will move the ring against the abutment.

CHARLES CYRIL HALKYARD.